United States Patent [19]

Ghaderi et al.

[11] Patent Number: 4,739,165

[45] **Date of Patent: * Apr. 19, 1988**

[54] MASS SPECTROMETER WITH REMOTE ION SOURCE

[75] Inventors: Sahba Ghaderi, Madison; Othman Vosburger, Oregon; Duane P. Littlejohn; Juda L. Shohet, both of Madison, all of Wis.

[73] Assignee: Nicolet Instrument Corporation, Madison, Wis.

[ * ] Notice: The portion of the term of this patent subsequent to May 13, 2003 has been disclaimed.

[21] Appl. No.: 833,975

[22] Filed: Feb. 27, 1986

[51] Int. Cl.[4] .............................................. B01D 59/44

[52] U.S. Cl. ...................................... 250/290; 250/291

[58] Field of Search ................................ 250/290, 291

[56] References Cited

U.S. PATENT DOCUMENTS

| | | | |
|---|---|---|---|
| 2,633,539 | 3/1953 | Altar | 250/290 |
| 3,984,681 | 10/1976 | Huntress | 250/290 |
| 4,081,677 | 3/1978 | Dawson | 250/290 |
| 4,093,856 | 6/1978 | Stenzel | 250/290 |
| 4,181,852 | 1/1980 | Berthod | 250/290 |
| 4,588,888 | 5/1986 | Ghaderi et al. | 250/290 |

*Primary Examiner*—Bruce C. Anderson
*Attorney, Agent, or Firm*—Kinney & Lange

[57] ABSTRACT

A remote ion source within an ICR mass spectrometer which provides an enhanced trapping (within an analyzer cell) of ions formed within that remote ion source. In a preferred embodiment, trapping enhancement is accomplished by means of magnetic perturbations of the magnetic field within the analyzer cell. The perturbations may be established by ferromagnetic means or electromagnetic means or by the use of permanent magnets to form a magnetic bottle. Ions formed within the remote ion source are extracted from that source by an electrostatic lens and directed toward the analyzer cell along the Z axis of the spectrometer magnetic field. Deceleration lenses, external to the analyzer cell, may be employed to further enhance the trapping capability of the analyzer cell. In some modes of operation, a ramped deceleration potential may be applied to the declaration lens for "grouping" of ions of different masses for analysis. Provision for mass selection is also made within the spectrometer disclosed herein.

21 Claims, 1 Drawing Sheet

MASS SPECTROMETER WITH REMOTE ION SOURCE

BACKGROUND OF THE INVENTION

1. Field of the Invention

The present invention relates to mass spectrometry and, more particularly, to an ion source that is positioned remotely from the spectrometer analytical cell.

2. Description of the Prior Art

Ion cyclotron resonance (ICR) is a known technique that has been usefully employed in the context of mass spectrometry. Typically, this technique has involved the formation of ions and their confinement and analysis within an analyzer cell. During analysis, the ions confined within the cell are excited and detected for spectral evaluation. In typical prior art systems, ion formation, trapping (confinement), excitation and detection all occur within the analyzer cell. An example of such a device is disclosed in U.S. Pat. No. 3,742,212, issued June 26, 1973, which is hereby incorporated by reference.

A later development, through which rapid and accurate mass spectroscopy became possible, employs Fourier Transform techniques and is commonly designated as Fourier Transform Mass Spectrometry (FTMS). This technique is disclosed in U.S. Pat. No. 3,937,955, issued Feb. 10, 1976, which is commonly owned with the present invention and which is also hereby incorporated by reference.

In conventional systems of the type described above, high resolution requires high magnetic field strengths and low operating pressures. To establish this environment, high field superconducting magnets and high speed vacuum pumping systems have been employed. As is known in the art, ions within this environment undergo a circular (orbital) motion known as cyclotron motion. This motion results from the thermal energy of the ions and the applied magnetic fields and is restricted in directions orthogonal to the magnetic field. It is conventional in the art to refer to directions orthogonal to the magnetic field in terms of X and Y axes which are axes orthogonal to the axis parallel to the magnetic flux lines—the parallel axis being commonly referred to as the Z axis.

During mass analysis, ions are restrained along the Z axis by electrostatic potentials applied to trapping plates. The mass analysis is performed either by measurement of the energy of an applied radio frequency excitation that is absorbed by the trapped ions at their cyclotron resonance frequency or by direct detection of the cyclotron frequency of the excited ions. Typically, the trapping plates are combined with other structures for ion excitation and detection to form an analyzer cell, the cell being positioned at the magnetic center of the superconducting magnet. At this magnetic center, and in the regions immediately adjacent, the magnetic field is generally homogeneous.

In conventional systems, it has been the practice to form ions for mass analysis within the analyzer cell. Ion forming techniques that have been employed include electron impact, laser desorption, cesium ion desorption, etc. In such systems, the transport of a sample to be analyzed to the analyzer cell for ionization (and analysis) has posed significant problems. These transport problems are compounded by the geometry of suitable superconducting magnets. In addition, sample introduction for ionization and analysis places significant demands on the high speed pumping systems that have been employed. Collisional damping of the ion signal, resulting from sample ionization and analysis in the same cell, reduces the mass resolution and sensitivity of the instrument. Magnet geometry also restricts placement of the ion formation devices and access to them.

As is apparent from the above, sample handling, including constraints imposed by system geometry, has limited the application of the described prior art ICR mass spectrometer systems.

One solution to the problem of increasing pressures resulting from sample introduction and ionization is disclosed in U.S. application Ser. No. 610,502 filed May 15, 1984 for Mass Spectrometer and Method, now U.S. Pat. No. 4,581,533 which is commonly owned with the present invention and which is hereby incorporated by reference. This system employs a cell of multiple sections and differential pumping. Sample introduction and ionization occurs in one cell section and analysis is performed in one or more other sections. Ion migration is permitted through the use of a conductance limit which allows the maintenance of a pressure differential between the cell sections and, accordingly, a differential pumping of those cell sections. The differential pumping allows an analyzer cell section at high vacuum. The separation of ion formation and analysis into distinct sections reduces collisional damping. However, the sample cell remains within the bore of the magnet. Thus, while sample handling problems are alleviated by this system, they are not fully addressed.

An alternative to the multiple-section cell, discussed above, is disclosed in U.S. Pat. No. 4,535,235 issued Aug. 13, 1985. In this system, a remote ion source is employed with a multiple stage rf quadrapole mass filter being employed to "transport" ions from the ion source to the analyzer cell. Differential pumping of the ion source and analysis section is provided. The ion source, being remote, allows easy access. Thus, sample handling difficulties associated with a common ion formation/analysis cells are ameliorated. However, the quadrapole arrangement is complex and contributes significantly to the system's size and cost. In addition, electrical interference from the quadrapole arrangement can affect the detection circuitry of the analyzer cell.

SUMMARY OF THE INVENTION

The present invention employs a remote ion source within an ICR mass spectrometer while providing trapping (within an analyzer cell) of ions formed within the remote ion source. In a preferred embodiment, ion trapping is accomplished by means of magnetic perturbations of the magnetic field within the analyzer cell. The perturbations may be established by ferromagnetic means, electromagnetic means or by the use of permanent magnets and may form a magnetic bottle. Ions formed within the remote ion source are extracted from that source by an electrostatic lens and directed toward the analyzer cell along the Z axis of the spectrometer magnetic field. Deceleration lenses, external to the analyzer cell, may be employed to further enhance the trapping capability of the analyzer cell. In some modes of operation, a ramped deceleration potential may be applied to the deceleration lens for "grouping" of ions of different masses for analysis. Provision for mass selection is also made within the spectrometer disclosed herein.

DETAILED DESCRIPTION OF THE PREFERRED EMBODIMENTS

Figure 1:
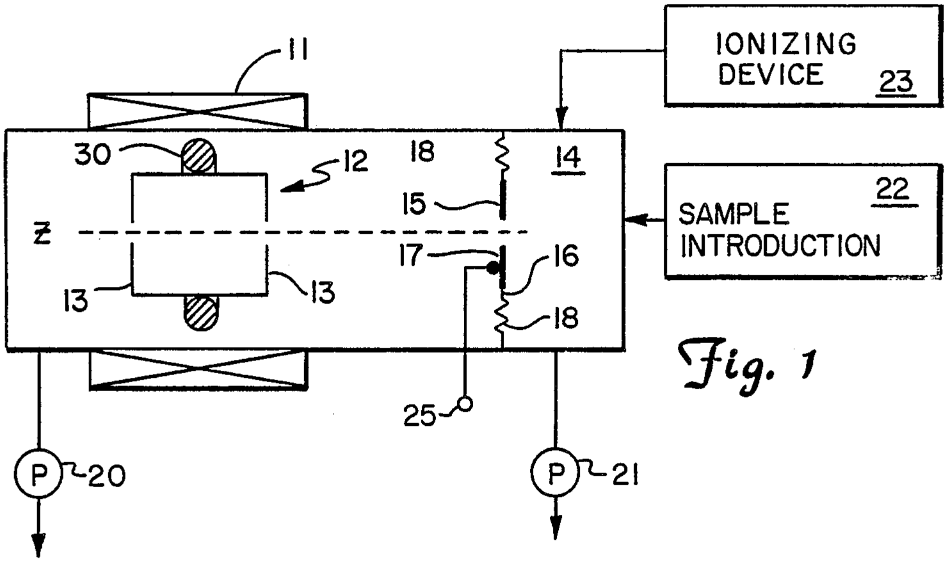
FIG. 1 is a diagramatic illustration of a mass spectrometer in accordance with the present invention.

FIG. 1 illustrates a preferred embodiment of a mass spectrometer in accordance with the present invention including conventional elements. Specifically, a vacuum chamber 10 is surrounded by a high field magnet 11, the high field magnet 11 typically being a superconducting magnet. An analyzer cell 12, which may be of any convenient single or multiple section design known to the prior art, is positioned generally at the magnetic center of the magnet 11 along the system Z axis (illustrated by the dotted line). As is known to the art, the analyzer cell 12 will include trapping plates 13, spaced from each other along the Z axis, and excitation and detection components. For the sake of clarity, only the trapping plates 13 are noted by reference numerals. By positioning the analyzer cell 12 at the magnetic center of the magnet 11, the cell is positioned within a homogeneous region of the field established by the magnet 11, in known manner.

The vacuum chamber 10 is divided into a first compartment, which includes the analyzer cell 12, and a second compartment 14 by a conductance limit indicated generally at 15. In the illustrated embodiment, the conductance limit 15 includes an electrostatic lens 16 (to be described more fully below) an orifice 17 and a seal 18 extending between the lens 16 and the walls of the vacuum chamber 10. In an alternative embodiment, the conductance limit may include a central orifice (as at 17) and seal (as at 18) with the electrostatic lens 16 being formed as a separate element. In either case, the orifice 17 allows ion passage from the ion source 14 to the compartment of vacuum chamber 10 that houses the analyzer cell 12 while allowing a differential pressure to be maintained within the two compartments of the vacuum chamber 10. Those differential pressures are established and maintained by pumps 20 and 21, each associated with a different one of the compartments and which may be of any design known to the prior art capable of establishing and maintaining high vacuum conditions which are known as desirable to those skilled in the art. At least one trapping plate 13 (the plate 13 closest to the ion source of compartment 14) is provided with an orifice along the Z axis to admit ions to the cell 12 which are formed within the ion source 14.

Ion source 14 is connected to a sample introduction system 22, which may be a source of any sample it is desired to ionize and analyze, and to a suitable ionizing device 23. Ionizing device 23 may be of any known type capable of forming ions from a sample introduced via sample introduction device 22 to the compartment 14. On sample introduction, the pressure within the compartment 14 will be elevated beyond that desirable for mass analysis. However, the conductance limit 15 will maintain a differential pressure between the compartment 14 and the other (analysis) compartment of the chamber 10 while the pump 20 will further serve to maintain desired pressure conditions within the analysis compartment of chamber 10 that contains the analyzer cell 12. Pump 21 will act on compartment 14 and reduce the pressure therein.

In operation, a sample will be introduced to the ion source of compartment 14 via sample introduction system 22. Ions will be formed from that sample through the action of the ionizing device 23. An electrostatic potential applied to the electrostatic lens 16, via a terminal 25, will result in an extraction of ions from the ion source 14 into the compartment containing the analyzer cell 12, in known manner. Those ions will be accelerated and directed along the Z axis and into the analyzer cell 12 through the trapping plate orifice discussed above. Extraction lenses such as that indicated at 16 and suitable for use within the embodiment of FIG. 1 are known to the prior art.

The physics of the embodiment of FIG. 1 discussed to this point predicts that the action of the trapping plates 13 alone would not trap a sufficient quantity of ions that were directed at the trapping plates from a remote ion source. To overcome this, the system of incorporated U.S. Pat. No. 4,535,235 employs a quadrapole arrangement. This quadrapole arrangement focuses and collimates ions extracted from a remote ion source and has the effect of reducing ion loss during flight. In essence, the quadrapole arrangement delivers a greater number of ions to the analyzer cell than would be the case without its use and, accordingly, the greater number of ions reaching the analyzer cell results in a greater number of ions being trapped within the cell through the combined action of energy changes from particle interaction and/or the trapping potentials applied to the trapping plates of that cell. The quadrapole arrangement also provides a mass selectivity.

In contrast to the quadrapole arrangement of U.S. Pat. No. 4,535,235, the present invention enhances the trapping capability of the analyzer cell. This is accomplished, in one embodiment, by perturbing the magnetic field within the analyzer cell as by a ferromagnetic ring 30 encircling the analyzer cell 12 in the embodiment of FIG. 1. Perturbation of the magnetic field results in a change in the pitch angle and allows ion trapping via the electrostatic potentials applied to the trapping plates 13. Additional trapping can result from ion-ion and ion-neutral collisions within the cell which may change the energy and/or the pitch angle of the ions. The pitch angle of the ions can also be changed within the cell boundaries by applying of an rf excitation voltage to the cell excitation plates. As illustrated, the magnetic field perturbation can be established by a ring within the vacuum chamber and encircling the cell 12. A similar ring encircling the analyzer cell 12 and lying outside the vacuum chamber will also suffice. In addition, a proper use of ferromagnetic (or slightly ferromagnetic) material may be employed in the construction of the cell itself, to result in the desired field perturbation. In any case, the field is perturbed to create a magnetic bottle within the analyzer cell 12 with that alteration in the magnetic field then contributing to the trapping of ions within the cell 13. As will be apparent to those familiar with the art, the polarity of the potential applied to the terminal 25 and, accordingly, to the extraction lens 16, will determine the polarity of the ions extracted from the ion source 14. Those ions are focused and directed (along the Z axis) to the analyzer cell 12 by the action of the magnetic field. A suitable trapping potential and polarity, as determined by the polarity of the ions extracted from the ion source 14, is applied to the trapping plates 13 of analyzer cell 12. Trapping, via magnetic field perturbation, will be effective on ions of either polarity. Neutral or ground connections and electrical connections to the analyzer cell are not illustrated with the several Figures but are well known to those familiar with the art.

Figure 2:
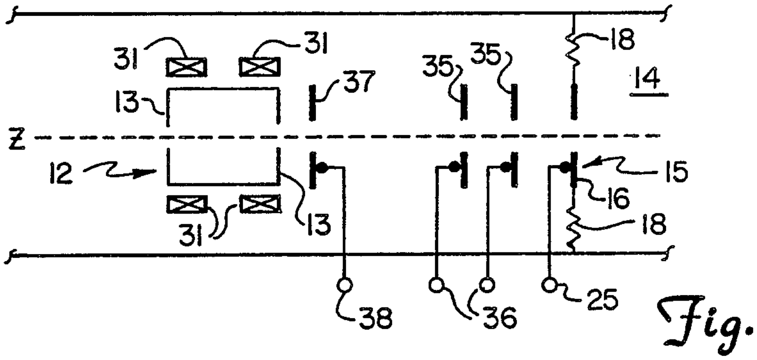
FIG. 2 diagramatically illustrates alternative and additional configurations within a mass spectrometer of the type illustrated in FIG. 1.

FIG. 2 illustrates a modification of a portion of the embodiment of FIG. 1 and additional elements that may be employed within that embodiment. Specifically, FIG. 2 illustrates a magnetic field perturbing system composed of electro-magnets 31 which may be alternatively, or additionally, employed with the ferromagnetic system discussed above with reference to FIG. 1 and diagramatically illustrated therein at 30. In addition, electrostatic lenses 35 are illustrated and positioned along the Z axis of the system and connected to terminals 36 to further accelerate and collimate or focus the ion flow along the system Z axis. Determination of the polarity and amplitude of the signals applied to the terminals 36 are known to those familiar with the art. A decelerating lens 37 has a repelling potential applied to it via a terminal 38, the purpose of that potential being to "slow" ions approaching the analyzer cell 12. As a result of deceleration through the action of the applied potential on deceleration lens 37, ion trapping via the trapping plates 13 of analyzer cell 12 is further enhanced. For the purposes of discussion of FIG. 2, to this point, the signals applied to each of the terminals 25, 36 and 38 is electrostatic and the lenses 16, 35 and 37 may be conventional electrostatic lenses.

Figure 3:
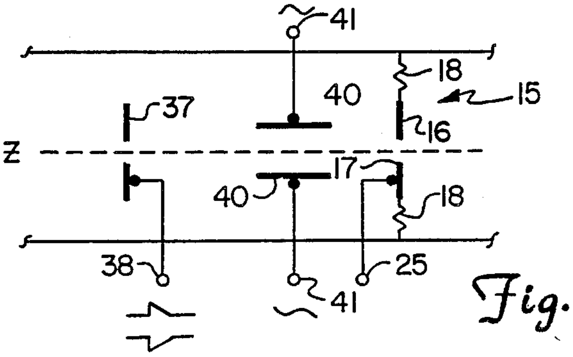
FIG. 3 illustrates still further alternatives to the configurations illustrated in FIGS. 1 and 2.

FIG. 3 illustrates a further addition to the system discussed above with reference to FIGS. 1 and 2 as well as an alternative or additional use of the deceleration lens 37. A mass spectrometer in accordance with the present invention may be employed in a continuous or pulsed mode. In a pulsed mode, ions are formed periodically within the ion source 14. On extraction with a constant electrostatic potential, ions of different masses are accelerated at different rates which can result in an effective mass discrimination within the analyzer cell 12 as a result of their difference in arrival times. This phenomena is known as "time-of-flight effect." To compensate for this when operating in the pulsed mode, a ramped potential may be applied to either or both the acceleration lens 35 or deceleration lens 37 such as that illustrated by the signals appearing adjacent terminal 38 in FIG. 3. Low mass ions, being accelerated more, will reach the cell first. However, the ramped potential will result in their being decelerated more than the high mass ions arriving at a later time. As a result, a ramped potential applied to the lens 37 can "bunch" the ions together to preserve mass spectral integrity.

Mass selection may also be achieved through a set or sets of ion ejection plates 40 connected to terminals 41. These plates are positioned between the ion source 14 and the cell 12 and along the Z axis of the system. Ions leaving the ion source 14 will pass between the plates 40 and experience ion cyclotron motion due to the presence of a magnetic field. The orbit size of this motion can be expanded in the same manner as the orbit size of ions is expanded within the cell 12—through excitation. That is, the application of an appropriate rf signal to the terminals 41 will expand the orbit size of resonant ions traveling along the Z axis such that they cannot pass through the aperture in trapping plate 13 (see FIG. 1 and accompanying discussion) which admits ions of smaller orbit into the cell 12. Thus, those ions are excluded from the cell 12 and effective mass filtering is accomplished. Such filtering can have particular advantage in experiments such as mass spectrometry/mass spectrometry (MS/MS), gas chromatography/mass spectrometry (GC/MS), liquid chromatography/mass spectrometry (LC/MS), etc., where the removal of certain ions is desired.

Obviously, many modifications and variations of the present invention are possible in light of the above teachings. For example, the alternatives of FIGS. 2 and 3 may be incorporated or substituted into the embodiment of FIG. 1 without departure from the scope of the present invention. The time-of-flight effect described above can be employed for mass discrimination to eliminate unwanted ions above or below a certain mass. The trapping plates 13 may be pulsed to operate as a gate for mass selection. It is also possible to use magnetic coils in addition to the electrostatic lenses to improve ion transmission efficiency from the remote source to the analyzer cell. This magnetic coil/coils could be positioned in the ion path, in between the ion source and the system main magnet.

The diversity of a mass spectrometer in accordance with the present invention is apparent. However, the primary advantage of the present invention is the provision of a remote ion source with enhanced trapping within the analyzer cell and without resort to complex structures such as quadrapoles. A separate ion source will allow ionziation techniques to be employed which would otherwise result in excessive vacuum chamber pressures while the remoteness of the ion source allows access to that source which is not obtainable when ions are formed within a cell at the magnetic center of the system magnet. It is therefore to be understood that, within the scope of the present invention, the invention may be practiced otherwise than as specifically described.

What is claimed is:

1. In a mass spectrometer of the type having vacuum chamber means, having means for producing an ion cyclotron resonance inducing magnetic field within said chamber means including a chamber means region wherein said produced magnetic field is generally homogeneous, having analyzer cell means within said chamber means region wherein ions are excited and detected, said analyzer cell means including electrostatic trapping means for confining ions within said cell to said cell, having conductance limit means dividing said chamber means into first and second compartments, said first compartment containing said analyzer cell means, having means for differentially establishing a vacuum in said first and second compartments and having means for ionizing a sample within said second compartment, the improvement wherein said second compartment and said analyzer cell means are spaced from each other and further comprising means for directing ions from said second compartment into said analyzer cell means, said electrostatic trapping means acting to trap ions directed into said analyzer cell means, and means for magnetically enhancing the trapping capability of said electrostatic trapping means on ions directed into said analyzer cell means.

2. The mass spectrometer of claim 1 wherein said trapping capability enhancing means comprises means for perturbing the magnetic field within said analyzer cell means.

3. The mass spectrometer of claim 2 wherein said magnetic field perturbing means comprises ferromagnetic means.

4. The mass spectrometer of claim 2 wherein said magnetic field perturbing means comprises electromagnetic means.

5. The mass spectrometer of claim 2 wherein said magnetic field perturbing means comprises permanent magnet means.

6. The mass spectrometer of claim 2 wherein said magnetic field perturbing means comprises means for forming a magnetic bottle.

7. The mass spectrometer of claim 1 wherein said trapping capability enhancing means comprises magnetic bottle means.

8. The mass spectrometer of claim 1 wherein said ion directing means comprises electrostatic lens means.

9. The mass spectrometer of claim 8 wherein said electrostatic lens means include means for extracting ions from said second compartment.

10. The mass spectrometer of claim 2 wherein said trapping capability enhancing means further comprises electrostatic lens means within first compartment and outside of said analyzer cell means.

11. The mass spectrometer of claim 1 wherein said trapping capability enhancing means comprises electrostatic deceleration lens means within said first compartment and outside of said analyzer cell means.

12. The mass spectrometer of claim 11 further comprising means for applying a ramped deceleration potential to said electrostatic deceleration lens means.

13. The mass spectrometer of claim 12 further comprising mass selection means within said first compartment.

14. The mass spectrometer of claim 2 wherein said trapping capability enhancing means comprises electrostatic deceleration lens means within said first compartment and outside of said analyzer cell means.

15. The mass spectrometer of claim 14 further comprising means for applying a ramped deceleration potential to said electrostatic deceleration lens means.

16. The mass spectrometer of claim 15 further comprising mass selection means within said first compartment.

17. The mass spectrometer of claim 16 wherein said magnetic field perturbing means comprises ferromagnetic means.

18. The mass spectrometer of claim 16 wherein said magnetic field perturbing means comprises electromagnetic means.

19. The mass spectrometer of claim 16 wherein said magnetic field perturbing means comprises means for forming a magnetic bottle.

20. The mass spectrometer of claim 16 wherein said magnetic field perturbing means comprises permanent magnet means.

21. The mass spectrometer of claim 1 further comprising means for applying a ramped deceleration potential to said extraction lens means.

* * * * *